Aug. 6, 1968 TAMOTSU TOJO 3,396,053
PHOTOCONDUCTIVE TARGETS
Filed Dec. 2, 1964
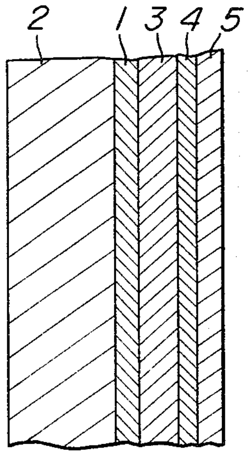
Inventor
Tamotsu Tojo
By Stevens, Davis, Miller & Mosher
ATTORNEYS United States Patent Office 3,396,053

Patented Aug. 6, 1968

3,396,053
PHOTOCONDUCTIVE TARGETS

Tamotsu Tojo, Kyoto, Japan, assignor to Matsushita Electronics Corporation, Osaka, Japan, a corporation of Japan Filed Dec. 2, 1964, Ser. No. 415,344
Claims priority, application Japan, Dec. 14, 1963, 38/67,691
11 Claims. (Cl. 117—217)

ABSTRACT OF THE DISCLOSURE

The lead monoxide layer of a target electrode for television cameras is stabilized against oxidative changes without substantial change in its photoconductive properties by application thereto of a thin film of a chalcogen with an outer thin film of silver on the chalcogen film. The chalcogen may be sulfur, selenium or tellurium, or combinations thereof, preferably selenium.

This invention relates to photoconductive targets, particularly for use in television camera tubes.

Photoconductive materials, the electrical conductivities of which vary in response to incident light intensity, are known as applicable to photoconductive targets of television camera tubes for transducing optical images into a series of electrical signals.

As photoconductive materials are known some elements and a large number of chemical compounds, such as, for example, sulfides, selenides, oxides, etc., of various metals, but only a few of them are known as comparatively satisfactory for use in photoconductive targets of television camera tubes. Lead monoxide [PbO] is one of such a few materials known.

Photoconductive targets of television camera tubes should satisfy rigid requirements with respect to their characteristics, including sensitivity, speed of response and uniformity. These characteristics are widely different for different photoconductive materials used. Moreover, for a given material, these characteristics may become considerably different depending on the conditions of manufacture, including evaporation process and heat treatment process.

The primary object of the present invention is to provide a photoconductive target employing lead monoxide as an effective constituent, in which a difficulty in manufacture due to chemical unstability of lead monoxide is considerably mitigated.

The present invention is characterized by the construction of photoconductive target obtained by evaporating a layer of lead monoxide onto a transparent electrically conductive coating on a glass substratum, and after heat treatment of said layer of lead monoxide, evaporating chalcogen and/or chalcogenide onto the lead monoxide layer, and then evaporating a thin film of silver.

There are other objects and particularities of the present invention, which will be made obvious from the following detailed description of the invention, with reference to the accompanying drawing which shows a cross-sectional view of a photoconductive target embodying the invention.

Lead monoxide is featured by its high dark electrical resistivity, high sensitivity in short wavelength region including visible region, and relatively high speed of response to a rapid variation of the incident light intensity.

Chemically, on the other hand, lead monoxide is relatively unstable. For instance, lead monoxide readily absorbs water vapor, carbon dioxide, etc., in air even at room temperature, to change to lead hydroxycarbonate $[PbCO_3 \cdot Pb(OH)_2]$. The said unstability makes it difficult to provide a photoconductive target, consisting of lead monoxide only, realizing the above-mentioned features of lead monoxide.

According to the present invention, a film of silver is evaporated in order to eliminate such a drastic change in chemical composition of lead monoxide as caused by the influence of surrounding air and vapor.

Basically, the electrical properties of lead monoxide depend on its chemical composition; the dark electrical conductance, for example, is determined by the deviation from chemical stoichiometry, and it is minimum at stoichiometric composition. When lead monoxide contains oxygen atoms in excess, lead ion vacancies or interstitial oxygen ions give rise to free holes, while when lead monoxide contains lead atoms in excess, oxygen ion vacancies or interstitial lead ions give rise to free electrons, whereby lead monoxide exhibits either p-type or n-type conductivity, respectively.

In an evaporated layer, moreover, its electrical characteristics mainly depend upon the surface, rather than the inside, conditions of crystalline particles forming the lead monoxide layer, contact at the boundaries between those particles, etc.

When oxygen exists therearound under a certain pressure above the equilibrium pressure, oxygen is adsorbed and/or absorbed at the surfaces of the particles, and thus the surface regions of the particles become much more p-type compared to the inside. Consequently, in n-type crystalline particles, p-n junctions will be formed near the surface regions, resulting in the lead monoxide layer of apparently very high resistance. With regard to this, a comprehensive explanation will be given below.

When evaporation is effected in a high vacuum or in low-pressure oxygen atmosphere, lead monoxide dissociates during evaporation losing oxygen. Consequently, crystalline particles at the moment of their deposition tend to contain excess lead atoms and exhibit so-called n-type conductivity. After the deposition, the crystalline particles may adsorb some ambient oxygens that would exist even in a high vacuum, and the crystal surfaces may naturally be rendered excess-oxygen condition. Excess-oxygen condition at the surfaces of the crystalline particles may also be obtained artifically by causing adsorption of oxygen by means of heat treatment. So-called p-type conductivity is thus obtained at the surfaces of the crystalline particles. It is considered, therefore, that oxygen concentration varies continuously between the n-type core and the p-type shell of each crystalline particle. For this reason, the so-called stoichiometric region of maximum resistivity exists adjacent the surface of particle, which encloses n-type core of low resistivity. It is of no doubt that such cores enclosed in high-resistance shells cannot appreciably contribute to electrical conduction of the layer, while the conduction circuit being formed of series of high-resistance shells. It is now concluded that the exitsence of oxygen, or other acceptors (p-type impurities), is necessary for obtaining high resistance required for photoconductive target.

If, however, adsorbed oxygen is used as acceptor, the photoconductive target being sealed in a vacuum container as part of television camera tube, the adsorbed oxygen tends to desorb from the surfaces of crystalline particles of lead monoxide, and the electrical resistivity thereof is affected. Particularly when the camera tube is being operated, part of holes produced by light in the lead monoxide layer and drifting towards the surface of lead monoxide layer kept in negative potential by the electrical field applied to the layer, will combine on their way with oxygen adsorbed to the crystalline particle in the state of negative ion, and consequently, the adsorbed oxygen will become electrically neutral to lose electric bonding force, resulting in desorption. And, after the light or electric field or both of them are removed, the desorbed oxygen will be adsorbed again by the lead monoxide partly or wholly. This fact has a certain relation with the so-called burn-in or sticking phenomena and abnormally slow response or lagging, often observed in television camera tubes employing lead monoxide.

According to the present invention, a film of chalcogen and/or silver chalcogenides is evaporated onto the lead monoxide layer in order to eliminate such disadvantages as caused by adsorption and desorption of oxygen at the surfaces of crystalline particles of lead monoxide.

Referring now to the drawing, a description will be given of an embodiment in which silver sulfide is employed as the vapor source for both sulfur and silver films.

EMBODIMENT 1

The glass plate 2 with a transparent electrically conductive coating 1 was heated to and maintained at a temperature of 100° C., and in an oxygen atmosphere of about $10^{-3}$ mm. Hg lead monoxide on a platinum boat was heated and evaporated to deposit lead monoxide on the coating 1 to form a layer 3 of thickness of about 20 microns. After then, also in an oxygen atmosphere of about $10^{-3}$ mm. Hg, the lead monoxide layer 3 was heated to a temperature between 300° and 330° C. for about 30 minutes. The layer 3 thus obtained consisted of minute crystalline particles of lead monoxide having particle size of a fraction of one micron. A sulfur film 4 containing some silver, and a silver film 5 containing some sulfur were then formed by vacuum evaporation process on the lead monoxide layer 3, successively. In particular, the lead monoxide layer 3 having been subjected to heat treatment was kept at 120° C., and the temperature of silver sulfide on a platinum boat disposed in opposition to the layer 3 was gradually elevated. When the temperature had reached about 950° C., silver sulfide abruptly decomposed to form a sulfur film 4, containing some silver, on the surface of lead monoxide layer 3, and then a silver film 5, containing some sulfur, was formed thereon. Attention was drawn to the consequences that some of sulfur atoms might diffuse into the lead monoxide layer 3 to some extent and be adsorbed at the surfaces of crystalline particles of the lead monoxide. When the platinum boat was kept apart from the lead monoxide layer 3 by 30 mm., and about 2 mg. of silver sulfide was used for evaporation, the thickness of sulfur film 4 and silver film 5 were about several tens A. and several hundreds A., respectively.

In the photoconductive target according to the present invention, the film 4, described in the Embodiment 1, may be formed of an element selected from the element group known as chalcogen consisting of sulfur, selenium and tellurium, or of one of combinations of said elements as sulfur/selenium, sulfur/tellurium, selenium/tellurium and sulfur/selenium/tellurium. A small part of the film 4 of chalcogen exists chemically in the form of lead chalcogenide and silver chalcogenide. Moreover, there are some different ways to obtain the film 4. For instance, to form a film 4 of sulfur, as has been mentioned, a decomposable compound like silver sulfide is used.

In the photoconductive target having the above-described construction according to the present invention, the silver film 5 formed by evaporation protects the lead monoxide layer 3 against its direct contact with the outside air, serving as a protecting covering, whereby is kept minimum any permanent change in nature of the lead monoxide layer 3 due to adsorption and/or absorption of adverse gases released from electron gun or encountered during manufacture of a camera tube, such as for example, during mounting of electron gun, pumping of the tube.

Further, in the photoconductive target embodying the invention, bivalent chalcogen atoms presumably behaving as acceptor impurity similar to oxygen by virtue of their valency being the same with oxygen cover lead monoxide crystalline particles forming the surface portion of lead monoxide layer, at which adsorption and desorption are apt to occur to the maximum extent, and such chalcogen atoms stay on the surfaces of lead monoxide crystalline particles more permanently than oxygen atoms do,[1] whereby stable p-type regions by virtue of chalcogen are obtained at the surface portions of crystalline particles. As a result the aforementioned slow response or lagging due to photo-chemical change during operation of photoconductive target by virtue of light and electric field is remarkably mitigated.

Even though monovalent silver atoms also behave as acceptor-type impurity in lead monoxide layer, and are expected to be effective in a similar manner as described for chalcogen, they have a tendency to readily diffuse for rendering the entire bulk of crystalline particles of lead monoxide p-type. Consequently, use of silver alone is not preferred. Experiments show that, if silver is evaporated directly onto the lead monoxide layer, satisfactorily rapid response is obtained, but sensitivity is remarkably low, and dark current increases promptly within a short time of operation. This is one of the reasons why the chalcogen film 4 is necessarily formed between the lead monoxide layer 3 and the silver film 5.

It has been found that, in case when the lead monoxide layer is maintained at a temperature between 100° C. and 160° C., preferably at about 120° C., during evaporation of silver, the thin film 5 obtained is formed of fine particles and consequently, there is no fear of damaging image-resolving power required for television camera tubes. Against adverse gases that might impinge through interstices of silver particles, the film of chalcogen and/or chalcogenides 4 serves as an additional protective film. If the lead monoxide layer is kept below 100° C. during the silver evaporation, silver particles formed are so minute that the silver film becomes too dense, resulting in low image-resolving power by virtue of decreased lateral resistivity. One the other hand, if the lead monoxide layer is kept above 160° C. during the silver evaporation, even for a short duration of time, the lead monoxide layer makes a change in its composition and structure and, moreover, silver thus deposited rapidly diffuses through the film 4 into the lead monoxide layer.

As has been mentioned, the photoconductive target according to the present invention consists of a film of chalcogen sandwiched between a lead monoxide layer and a silver film. For this arrangement, the characteristics of the photoconductive target are, of course, different for different nature of the film of chalcogen.

EMBODIMENT 2

Evaporation and afterheat-treatment of a lead monoxide layer 3 were carried out in the same way as described in the Embodiment 1. After then, a selenium film 4 was formed by vacuum evaporation process on the lead monoxide layer 3 kept at 120° C. during selenium evaporation. Finally, a thin film of silver was evaporated onto the selenium film, while the substratum being kept at a temperature of about 120° C. In this case, a mixture of 0.3 mg. selenium and 1.2 mg. silver on a platinum boat was heated by applying a gradually increasing heating current to the boat.

Selenium film covered lead monoxide layer more tightly than sulphur film did, resulting in a less change in the dark current of the target due to a less change in oxygen content of the lead monoxide layer.

EMBODIMENT 3

Evaporation and afterheat-treatment of a lead monoxide layer weer carried out in the same way as described in the Embodiment 1. A film 4 of tellurium was evaporated by heating 0.3 mg. tellurium on a molybdenum boat, while the substratum being kept at a temperature of about 180° C. After then, a thin film of silver was evaporated onto the tellurium film 4 kept at 120° C.

[1] This change made at American Consulate General, Osaka, Japan, Nov. 27, 1964.

The photoconductive target thus obtained showed higher sensitivity to the red light.

EMBODIMENT 4

Evaporation and afterheat-treatment of a lead monoxide layer were carried out in the same way as described in the Embodiment 1. Films 4 and 5 were formed by evaporating a mixture of 0.3 mg. selenium and 1.2 mg. silver sulfide on a platinum boat, while the substratum being kept at a temperature of about 120° C.

By gradually heating up the mixture a film of selenium was evaporated first on the lead monoxide layer, and, secondly, the silver sulfide gave out sulfur when it decomposed, and finally the decomposed silver evaporated onto the film 4 consisting of selenium and sulfur.

The obtained photoconductive target showed satisfactory sensitivity, speed of response and resolving power.

Materials to be used for forming the film 4 are not restricted to the materials described in the above embodiments. It has been found that when such mixtures as selenium/tellurium or sulfur/selenium/tellurium are used for forming the film 4, photoconductive targets having satisfactory characteristics are obtained.

I claim:

1. A photoconductive target comprising a conductive substratum, a layer of lead monoxide on said conductive substratum, a thin film of silver, and an intermediate film comprising chalcogen from the group consisting of sulfur, selenium, tellurium and mixtures thereof sandwiched between said lead monoxide layer and said silver film.

2. A photoconductive target according to claim 1 wherein the intermediate film is composed in part of a compound of lead and the member of the chalcogen group and in part of a compound of silver and the member of the chalcogen group.

3. A photoconductive target according to claim 1 wherein the chalcogen is sulfur.

4. A photoconductive target according to claim 1 wherein the chalcogen is selenium.

5. A photoconductive target according to claim 1 wherein the chalcogen is tellurium.

6. A photoconductive target according to claim 1 wherein the chalcogen is a mixture of sulfur and selenium.

7. In the method for preparing a photoconductive target comprising a conductive substratum and a layer of lead monoxide deposited thereon, the improvement which comprises evaporating a chalcogen from the group consisting of sulfur, selenium, tellurium and mixtures thereof and depositing the same as a thin film upon said lead monoxide layer and then depositing a thin film of silver upon said chalcogen film, said target being kept under vacuum and at a temperature within the range 100°–180° C. during the deposition of said films.

8. The process according to claim 7 wherein the chalcogen film comprises sulfur derived from thermal decomposition of silver sulfide and the silver film comprises residual silver from said decomposition, and the temperature is maintained within the range 100°–160° C.

9. The process according to claim 8 wherein the silver sulfide is thermally decomposed in admixture with selenium and the temperature is maintained within the range 100°–160° C.

10. The process according to claim 7 wherein the chalcogen is selenium and the temperature is maintained within the range 100°–160° C.

11. The process according to claim 7 wherein the chalcogen is tellurium, and the temperature is about 180° C.

References Cited

UNITED STATES PATENTS

| | | | |
|---|---|---|---|
| 2,687,484 | 8/1954 | Weimer | 117—215 |
| 2,890,359 | 6/1959 | Heijne et al. | 313—65 |
| 3,003,075 | 10/1961 | Krieger et al. | 313—65 |

ALFRED L. LEAVITT, *Primary Examiner.*

C. K. WEIFFENBACH, *Assistant Examiner.*